United States Patent [19]

Blytas

[11] 4,409,199

[45] Oct. 11, 1983

[54] REMOVAL OF $H_2S$ AND COS

[75] Inventor: George C. Blytas, Houston, Tex.

[73] Assignee: Shell Oil Company, Houston, Tex.

[21] Appl. No.: 330,048

[22] Filed: Dec. 14, 1981

[51] Int. Cl.$^3$ ...................... B01D 53/34; C01B 17/04
[52] U.S. Cl. ............................... 423/573 G; 423/226; 423/228; 423/243
[58] Field of Search ............... 423/226, 227, 228, 229, 423/571, 573, 224, 243, 232

[56] References Cited

U.S. PATENT DOCUMENTS 3,961,015 8/1969 Dailey .................................. 423/229
4,233,141 11/1980 Beavon et al. ................... 423/226 X
4,278,646 7/1981 Lynn et al. .......................... 423/226
4,332,781 6/1982 Lieder et al. ..................... 423/226 X Primary Examiner—Earl C. Thomas
Attorney, Agent, or Firm—Albert J. Adamcik

[57] ABSTRACT

A process for the removal of $H_2S$ and COS from gas streams containing high concentrations of $H_2S$ is described, the process being characterized by close integration of absorption and reaction techniques. In particular, the bulk of the $H_2S$ is first absorbed from the gas stream, the balance being removed by oxidation after treatment of the stream to hydrolyze the COS.

13 Claims, 2 Drawing Figures

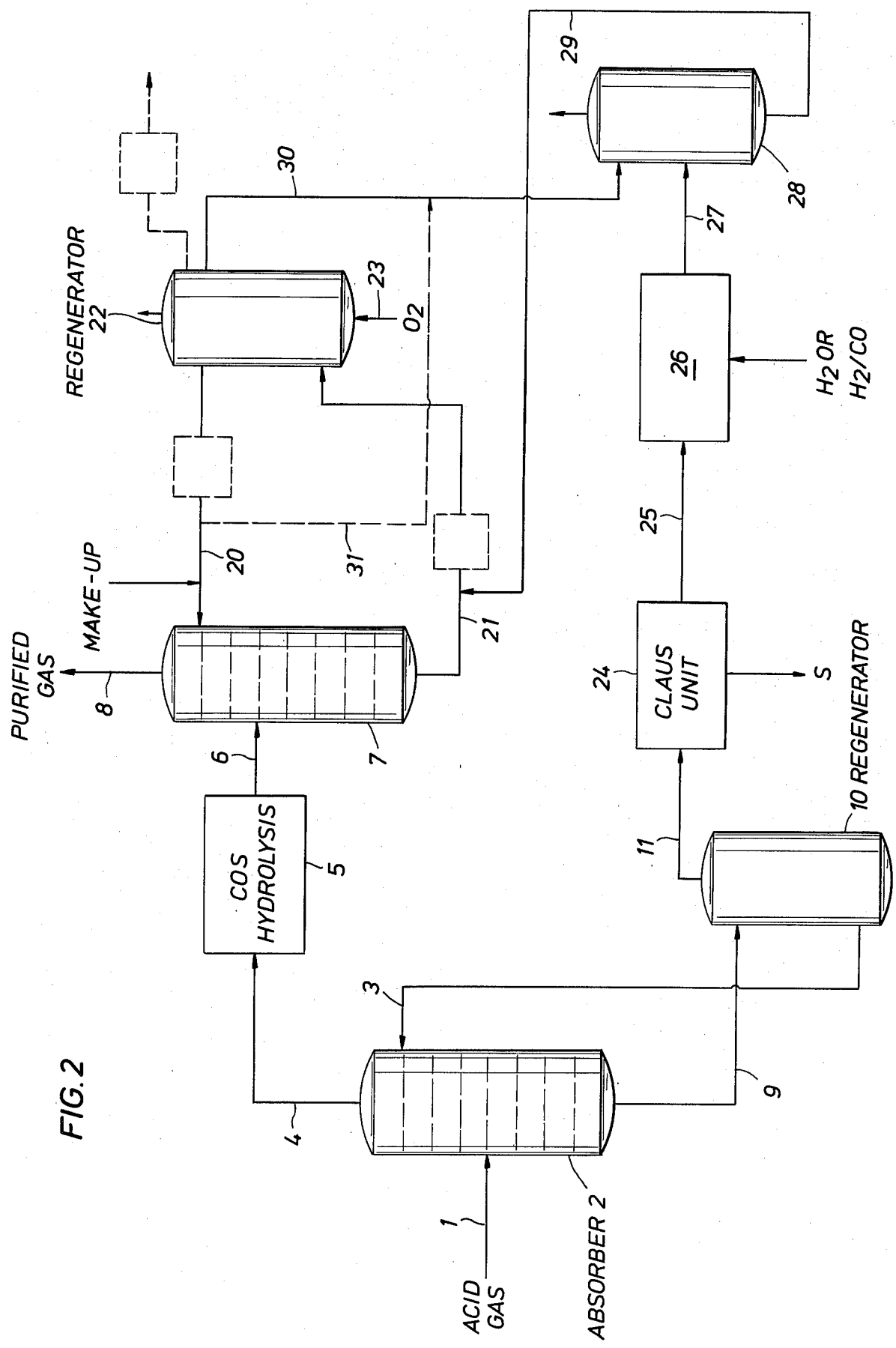

REMOVAL OF H₂S AND COS

BACKGROUND OF THE INVENTION

The hydrogen sulfide content of some naturally-occurring gases, synthesis gases, process gases, and fuel gases produced by gasification procedures, e.g., gases produced by the gasification of coal, petroleum, shale, tar sands, etc., is often at environmentally unacceptable levels. In order to meet increasingly stringent total sulfur content requirements, effective procedures for removal of this contaminant from these "sour" gases are necessary. An additional contaminant in $H_2S$-containing streams in carbonyl sulfide (COS). In particular, this contaminant poses problems in conventional solvent-absorption schemes since it hydrolyzes slowly and cannot be released with the vent gas.

Where the concentrations of $H_2S$ are high, say 5 to 50 percent by volume, the economics of $H_2S$ removal can become critical insofar as utilization of a given process or use of a particular fuel is concerned. For example, if solvent systems are utilized to remove the $H_2S$, the offgases from the recovery system usually must be subjected to extensive cleanup, including incineration, in order to meet environmental requirements. On the other hand, if chemical removal, e.g., reaction of the $H_2S$ directly with a regenerable reactant is utilized, the degradation or loss of reactant, which must be replaced, is a significant cost factor. As is evident, significant problems have existed in the purification of gas streams containing high concentrations of $H_2S$, and COS. The invention seeks to overcome these problems.

SUMMARY OF THE INVENTION

Accordingly, the invention relates to a process for the removal of $H_2S$ and COS from a sour gaseous stream containing $H_2S$ and COS which comprises contacting the sour gaseous stream with an aqueous absorbent in an absorption zone under conditions to absorb the bulk of the $H_2S$, and producing a product gas stream containing a reduced $H_2S$ concentration and COS, and a loaded absorbent mixture; contacting the product gas stream containing COS with a catalyst for the hydrolysis of COS, in the presence of water, and under conditions to react COS and water, and producing a gas stream containing $CO_2$ and $H_2S$, removing $H_2S$ from the gas stream by contacting the gas stream in a first contact zone with an aqueous reactant solution which comprises an effective amount of an oxidizing reactant, at a tempeature below the melting point of sulfur, and producing a purified gaseous stream and a reactant solution containing sulfur and reduced reactant; concomitantly removing loaded absorbent mixture from the absorption zone, and regenerating the loaded absorbent to produce an acid gas stream comprising $H_2S$ and a regenerated absorbent; and returning regenerated absorbent to the absorption zone. More particularly, the invention relates to a process of the type described wherein the acid gas stream produced is oxidized to produce sulfur, and the reactant solution containing sulfur from the first contact zone is regenerated and sulfur is recovered. In its preferred form, the offgases from the oxidation of the acid gas stream are reduced to produce $H_2S$, the $H_2S$ is contacted in a second contact zone with an aqueous oxidizing reactant solution which comprises an effective amount of an oxidizing reactant to produce a purified offgas, and a reactant solution containing sulfur and a reduced reactant, and the reactant solution containing reduced reactant is regenerated, preferably in the same regeneration zone employed with the COS hydrolysis effluent $H_2S$ removal step, as set out more fully herein.

As is evident, the process of the invention is preferably operated as a cyclic procedure with provision for removal of sulfur produced and regeneration of the respective absorbent or reactant mixtures. In particular, the process of the invention provides for regeneration of the $H_2S$ absorbent and for sulfur removal before or after regeneration of the aqueous reactant solution mixture from the first contact zone. If a reactant solution is utilized to remove the $H_2S$ produced from reduction of the offgases when $H_2S$ oxidation is employed, the resulting reactant solution may be combined with the "primary" aqueous reactant solution, sulfur being removed after the combination. Alternatively, the sulfur from each reaction zone may be removed separately. Sulfur removal from solution may be accomplished by means such as extraction, liquid or froth flotation, filtration, or use of a hydroclone, etc.

DETAILED DESCRIPTION OF THE INVENTION

Figure 1:
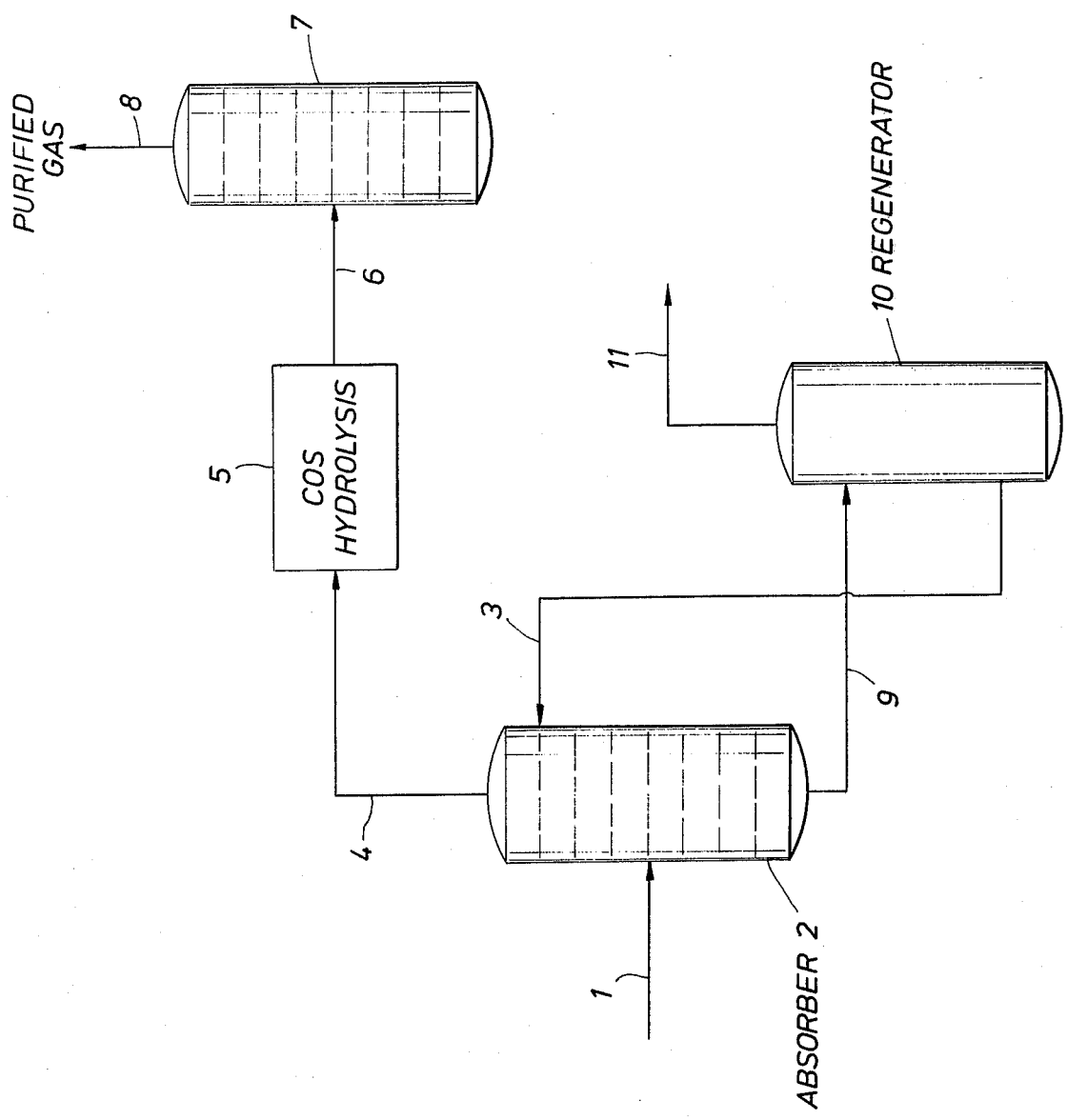

According to the first step of the process, the $H_2S$ containing gas stream is contacted in an absorption zone in a manner that will absorb the bulk (preferably at least 80 percent by volume) of the $H_2S$ in the stream. Any of the known absorbents conventionally used may be employed. For example, aqueous alkali metal carbonate and phosphate solutions, e.g. aqueous potassium and sodium carbonate and phosphate, carbitol (diethylene glycol monoethyl ether), and certain aqueous alkanolamines, such as alkyl diethanolamines, may be used. Suitable alkanolamines include methyldiethanolamine, triethanolamine, or one or more dipropanolamines, such as di-n-propanolamine or diisopropanolamine. Aqueous methyldiethanolamine, triethanolamine and dipropanolamine solutions are preferred absorbents, particularly methyldiethanolamine and diisopropanolamine solutions. The solutions may certain very minor amounts of physical solvents, such as substituted or unsubstituted tetra methylene sulfones.

If diisopropanolamine is used, either high purity diisopropanolamine may be used or technical mixtures of dipropanolamine such as are obtained as the by-product of diethanolamine production may be used. Such technical mixtures normally consist of more than 90% by weight of diisopropanolamine and 10% by weight or less of mono- and tri-propanolamines and possibly trace amounts of diethanolamine. Concentrations of aqueous alkanolamine solutions may very widely, and those skilled in the art can adjust solution concentrations to achieve suitable absorption levels. In general, the concentration of alkanolamine in aqueous solutions will be from 5 to 60% by weight, and preferably between 25 to 50% by weight. However, since the COS in the gas is to be removed, as described herein, it is not desired that any absorbent employed, under the conditions specified, exhibit a significant solvency for COS.

Suitable temperature and pressure relationships for different hydrogen sulfide-selective absorbents are known, or can be calculated by those skilled in the art. In general, the temperatures employed in the absorption zone are not critical, and a relatively wide range of temperatures, e.g., from 0° to 100° C. may be utilized. A range of from about 0° to about 85° C. is preferred. In many commercial applications, such as the removal of $H_2S$ from natural gas to meet pipeline specifications, absorption at ambient temperatures is preferred since the cost of refrigeration would exceed the benefits obtained due to increased absorption at the lower temperature. However, in certain applications, such as the treatment of acid gas mixtures containing relatively high concentrations of $CO_2$ vis-a-vis $H_2S$, absorption is conducted at relatively low temperatures, i.e., below 30° C., and preferably below 10° C., even though refrigeration of the solvent and/or feed may be required.

Similarly, in the regeneration or stripping zone, temperatures may be varied widely, the only requirement being that the temperatures be sufficient to reduce the $H_2S$ content in the absorbent to a level sufficient so that, when returned to the absorption zone, the absorbent will effectively absorb $H_2S$ from the gas to be treated. Preferably, the temperature should be sufficient to reduce the $H_2S$ content in the load absorbent to a level which corresponds to an equilibrium loading for an $H_2S$ content having less than 50 percent (preferably 10 percent) of the $H_2S$ content of the treated gas. Equilibrium loading conditions for $H_2S$ and $CO_2$ at varying concentrations, temperatures and pressures for different hydrogen sulfide-selective absorbents are known or can be calculated by known methods and hence need not be detailed herein. In general, temperatures of from about 90° C. to 180° C., preferably from 100° C. to 170° C., may be employed.

Similarly, pressure conditions in the absorption zone may vary widely, depending on the pressure of the gas to be treated. For example, pressures in the absorption zone may vary from one atmosphere up to 150 or even 200 atmospheres. Pressures of from 1 atmosphere to about 100 atmospheres are preferred. In the regeneration or desorption zone, pressures will range from about 1 atmosphere to about 3 atmospheres. As noted, the pressure-temperature relationships involved are well understood by those skilled in the art, and need not be detailed herein. Contact times in the absorption zone, insofar as meaningful, will depend, inter alia, on the velocity of the gas stream treated, the absorbent employed, and the type of contactor employed. In a tray column, for example, contact time might usefully be described as the total time a given volume of gas is present in the given absorber, recognizing that gas liquid contact may not occur continuously in such a unit. Given these qualifications, "contact" times will normally range from 1 second to 30 seconds, preferably from 1 second to 20 seconds.

In sum, the conditions for the absorption and regeneration should be so specified that the bulk of the $H_2S$, preferably 80 to 90 percent and most preferably at least 95 percent, by volume, of the $H_2S$ in the gas is absorbed. Such conditions, including choice of solvents and, e.g., number of trays, if a tray contactor is used, will provide that very little COS is absorbed. As will be evident to those skilled in the art, what is desired is to reject as much COS as possible, recognizing that, to do so, significant quantities (e.g. 0.1 percent to 3 percent by volume) of $H_2S$ will remain in the gas.

The gaseous stream, now having a reduced $H_2S$ concentration, is treated to remove COS. To this end, the stream is contacted, with a catalyst, in the presence of water, for hydrolysis of the COS. The hydrolysis of COS is shown by the following formula:

$$COS + H_2O \rightarrow H_2S + CO_2$$

In general, the contacting of the gas stream of COS with the absorbent often provides sufficient water, as vapor, for the hydrolysis of the COS, although additional water may be added if the COS concentration is high.

Any catalyst demonstrating activity for this reaction may be employed. Preferred catalysts are Ni, Pd, Pt, Co, Rh or In. In general, most of these materials will be provided as solids deposited on a suitable support material, preferred amorphous support materials being the aluminas, silica aluminas, and silica. Crystalline support materials such as the aluminosilicates, known as molecular sieves (zeolites), synthetic or natural, may also be used. The selection of the particular catalyst (and support, if employed) are within the skill of those working in the field. Platinum on alumina is preferred.

The tempeatures employed in the hydrolysis zone are not critical, except in the sense that the temperatures employed will allow substantially complete conversion of the COS. Temperatures will range from about 50° C. to 150° C. or even 200° C., although a range of from about 50° C. to about 150° C. is preferred. As noted previously, in many commercial applications, such as the removal of $H_2S$, $CO_2$, and COS from natural gas to meet pipeline specifications, contact at ambient temperatures or as close to ambient temperatures as possible are preferred. Those skilled in the art may adjust the temperatures, as needed, to provide efficient reaction temperatures. Contact times will range from about 0.5 second to about 10 seconds, with contact times of 1 second to 3 seconds being preferred. Pressures employed in the hydrolysis zone may be atmospheric, below atmospheric, or greater than atmospheric.

In accordance with the invention, the $H_2S$ produced from the COS hydrolysis is removed by contacting the gas stream with a mixture containing an oxidizing reactant. Any suitable oxidizing reactant material may be utilized. Particularly suitable reactant materials include polyvalent metallic ions, (and mixtures thereof), such as iron, vanadium, copper, manganese, and nickel, and include polyvalent metal chelates, (and mixtures thereof), and mixtures of the ions and chelates. As used herein, unless otherwise inconsistent with the intent expressed, the term "mixtures thereof," in referring to the reactant materials indicated, includes mixtures of the polyvalent metal ions, mixtures of the polyvalent metal chelates, and mixtures of polyvalent metal ions and polyvalent metal chelates. Preferred reactants are coordination complexes in which polyvalent metals form chelates with an acid having the formula:

$$(X)_{3-n}-n-(Y)_n$$

wherein n is a whole number from 1 to 3; Y is an acetic acid or propionic acid group; X is 2-hydroxyethyl, 2-hydroxypropyl, or an alkyl group having from one to four carbon atoms; or

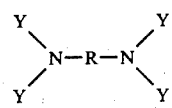

wherein
from two to four of the groups Y are selected from acetic and propionic acid groups;

from zero to two of the groups Y are selected from 2-hydroxyethyl, 2-hydroxypropyl, and

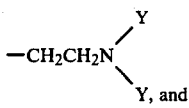

R is ethylene, propylene or isopropylene or alternatively cyclo hexane or benzene where the two hydrogen atoms replaced by nitrogen are in the 1,2 position, and mixtures of such complexes.

Any polyvalent metal may be used, but iron, copper and manganese are preferred, particularly iron. The polyvalent metal should be capable of oxidizing hydrogen sulfide, while being reduced itself from a higher to a lower valence state, and should then be oxidizable by oxygen from the lower valence state to the higher valence state in a typical redox reaction. Other polyvalent metals which can be used include lead, mercury, palladium, platinum, tungsten, nickel, chromium, cobalt, vanadium, titanium, tantalum, zirconium, molybdenum, and tin.

The polyvalent metal chelates are readily formed in aqueous solution by reaction of an appropriate salt, oxide or hydroxide of the polyvalent metal and the chelating agent in the acid form or an alkali metal or ammonium salt thereof. Exemplary chelating agents include amino acetic acids derived from ammonia or 2-hydroxy alkyl amines, such as glycine, diglycine (imino diacetic acid), NTA (nitrilo triacetic acid), 2-hydroxy alkyl glycine; di-hydroxyalkyl glycine, and hydroxyethyl or hydroxpropyl diglycine; amino acetic acids derived from ethylene diamine, diethylene triamine, 1,2-propylene diamine, and 1,3-propylene diamine, such as EDTA (ethylene diamine tetraacetic acid), HEDTA (2-hydroxy ethylethylene diamine triacetic acid), DETPA (diethylene triamine pentaacetic acid); amino acid derivatives of cyclic 1,2-diamines, such as 1,2-diamino cyclohexane-N,N-tetraacetic acid, and 1,2-phenylenediamine-N,N-tetraacetic acid, and the amides of polyamino acetic acids disclosed in Bersworth U.S. Pat. No. 3,580,950. The Fe(III) chelates of NTA and HEDTA are preferred.

The amount of reactant compound, chelate, or mixture thereof, supplied is an effective amount, i.e., that amount sufficient to convert all or substantially all of the $H_2S$ in the gas stream, and will generally be on order of at least about one mole (basis polyvalent metal or chemical equivalent) per mol of $H_2S$. Ratios of from about 1 or 2 mols to about 15 mols of compound or chelate per mol of $H_2S$ may be used, with ratios of from about 2 mols per mol to about 5 mols of compound or chelate per mol being preferred. The reactant is preferably supplied as an aqueous solution, although other solvents may be present. For example, other solvents or absorbents (or mixtures of absorbents) may be present to enhance $H_2S$ conversion, or absorb $CO_2$, the limiting factors bring the degree to which other components of the gas stream are absorbed in the solvent or absorbent and the degree to which the reactant compounds or chelates may be "salted" out or poisoned. Preferably, if an absorbent is employed, the absorbent employed is an absorbent which has a high degree of selectivity in absorbing $CO_2$ (and preferably $H_2S$ as well) from the gaseous streams. Any of the known absorbents conventionally used (or mixtures thereof) which do not affect the activity of the reactant, and which exhibit sufficient miscibility or solvency for the reactant or reactant solution may be employed. The particular absorbent chosen is a matter of choice, given these qualifications, and selection can be made by routine experimentation. For example, Carbitol (diethylene glycol monoethyl ether), propylene carbonate, tetraethylene glycol-dimethyl ether, N-methyl pyrrolidone, sulfolane, methyl isobutyl ketone, 2,4-pentanedione, 2,5-hexanedione, diacetone alcohol, hexyl acetate, cyclohexanone, mesityl oxide, and 4-methyl-4-methoxy-pentone-2 may be used. Suitable temperature and pressure relationships for different absorbents are known, or can be calculated by those skilled in the art.

The particular type of gaseous stream treated is not critical, as will be evident to those skilled in the art. Streams particularly suited to the practice of the invention are naturally-occurring gases, synthesis gases, process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, especially those streams of this type having low concentrations of $H_2S$ and $CO_2$. The term "hydrocarbon stream(s)," as employed herein, is intended to include streams containing significant quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, as indicated, the invention is particularly useful with streams containing up to 10 percent or even 60 percent by volume $H_2S$. $CO_2$ content may also vary widely, but will preferably range from about 0.1 percent to over 30 percent by volume. COS content may also vary, but normally will range from about 0.01 percent to about 1 percent by volume. In general, the ranges of gas compositions suitable for use in the invention can be determined by those skilled in the art on the basis of the equilibria of COS hydrolysis (described, for example, in Gas Purification, by Kohl and Riesenfeld, 1960, page 444). As will be recognized, the extent to which the hydrolysis of COS proceeds depends on the particular temperature employed and on the concentration of $CO_2$ and $H_2O$ present. For example, at 20° C. the hydrolysis equilibrium constant is $7.3 \times 10^5$, while at 100° C. it is $3.2 \times 10^4$. Obviously, then, the amounts of $H_2S$, $CO_2$ and COS present are not generally a limiting factor in the practice of the invention.

The temperatures employed in the contact zone are not generally critical, except that higher temperatures appear to enhance decomposition of complexes employed. A relatively wide range of temperatures below the melting point of sulfur may be used, e.g., from 10° C. to 80° C. or even 110° C. may be utilized, although a range of from about 20° C. to about 60° C. is preferred. In many commercial applications, such as the removal of $H_2S$ from natural gas to meet pipeline specifications, contact at ambient temperatures is preferred. Contact times may range from about 1 second to about 270 seconds, or longer, with contact times of 2 seconds to 120 seconds being preferred.

The reduced reactant is regenerated by stripping the absorbent admixture with oxygen. As used herein, the term "oxygen" includes oxygen-containing gases, such as air or air enriched with oxygen. The oxygen stripping accomplishes two functions, the stripping of any $CO_2$ (if present) and the oxidation of the reduced reactant to its higher oxidation state. The oxygen (in whatever form supplied) is supplied in a stoichiometric excess with respect to the amount of reduced reactant present in the mixture. Preferably, the oxygen is supplied in an amount of from about 1.2 to 3 times excess.

In the regeneration zone or zones, temperatures may be varied widely. Preferably, the regeneration zone should be maintained as close as possible to the same temperature as the contact or primary contact zone. If heat is added to strip or assist regeneration, cooling of the admixture is required before return of the admixture to the contact zone. In general, temperatures of from about 10° C. to 80° C., preferably 20° C. to 60° C. may be employed.

Pressure conditions in the first contact zone may vary widely, depending on the pressure of the gas to be treated. For example, pressures in the contact zone may vary from one atmosphere up to one hundred fifty or even two hundred atmospheres. Pressures of from one atmosphere to about one hundred atmospheres are preferred. In the regeneration zone or zones, pressures will range from about one atmosphere to about three or four atmospheres. The pressure-temperature relationships involved are well understood by those skilled in the art, and need not be detailed herein. Other conditions of operation for this type of reaction process, e.g., pH, etc., are further described in U.S. Pat. No. 3,068,065 to Hartley, et al, dated Dec. 11, 1962, and U.S. Pat. No. 4,009,251 to Meuly, issued Feb. 22, 1977, which disclosures are incorporated herein by reference. Preferably, if the iron chelate of nitrilotriacetic acid is used, pH in the process of the invention will range from about 6 to about 7.5, and the molar ratio of the nitrilotriacetic acid to the iron is from about 1.2 to 1.4. The procedure is preferably conducted continuously.

As indicated, the acid gas (containing substantial $H_2S$) produced from the absorbent regeneration zone is preferably oxidized to produce sulfur. The liberated $H_2S$ is preferably treated by that process known as the "Claus" process. In the "Claus" process, elemental sulfur is prepared by partial oxidation of the $H_2S$ to sulfur dioxide, using an oxygen-containing gas (including pure oxygen), followed by the reaction of the sulfur dioxide with the remaining part of the hydrogen sulfide, in the presence of a catalyst. This process, which is used frequently at refineries, and also for the workup of hydrogen sulfide recovered from natural gas, is carried out in a plant which typically comprises a combustion chamber followed by one or more catalyst beds between which are arranged one or more condensers in which the reaction products are cooled and the separated liquid elemental sulfur is recovered. To some extent, the amount of elemental sulfur recovered depends on the number of catalyst beds employed in the Claus process. In principle, 98% of the total sulfur available can be recovered when three beds are used.

Since the yield of recovered elemental sulfur, relative to the hydrogen sulfide introduced, is not quantitative, a certain amount of unreacted hydrogen sulfide and sulfur dioxide remains in the Claus offgases. These gases may be incinerated in a furnace or treated in other ways known to those skilled in the art.

In a preferred embodiment of the invention, the offgases are first reduced, e.g., with $H_2$ or $H_2/CO$ over a catalyst, and treated in the manner described in relation to the hydrolyzed stream mentioned, supra, i.e., with an oxidizing reactant solution. Reduction procedures of this type are described in U.S. Pat. No. 4,001,386 and Canadian Pat. No. 916,898 to Beavon, and per se form no part of the present invention. Any suitable reduction procedure may be employed, so long as it produces an $H_2S$ stream which may be treated by an oxidizing reactant solution to produce sulfur.

As indicated, the reduced offgases are treated in a second contact zone, in a fashion analogous to the treatment of the hydrolyzed stream, to produce sulfur. Similar conditions, e.g., of temperature, pressure, etc. may be employed. The purified offgases may be discharged, and the solution is similarly regenerated and sulfur recovered. In a preferred mode, the solution is regenerated in the same regenerator as that employed for the solution used to treat the hydrolyzed stream, the expense of an additional regenerating unit being saved. In this instance, the solutions employed would normally be identical or quite similar, although when separate regeneration units are employed this is not required.

In order to describe the invention in greater detail, reference is made to the accompanying drawing. The values given herein relating to temperatures, pressures, compositions, etc. are calculated or exemplary, and should not be considered as delimiting the invention.

FIG. 1 illustrates schematically the overall concept of the invention, while FIG. 2 illustrates schematically the combination regeneration feature described, supra.

In FIG. 1, a gas stream, such as a natural gas stream containing 25 percent $H_2S$, 1.5 percent $CO_2$, and 0.1 percent COS, enters contactor 2 via line 1. Contactor 2 is a six tray contactor, although any suitable contacting device (such as a venturi) may be employed. For illustrative purposes, it will be assumed that the gaseous stream enters at 200 MSCF per hour, while the absorbent, which comprises 50 percent diisopropanolamine, 35 percent $H_2O$, and 15 percent sulfolane (all by weight), enters via line 3 at 5.5 to 6 M gallons per hour. Pressure of the gas in line 1 is 1000 PSIG, temperature of the gas is 30° C., while temperature of the absorbent is also 30° C. A contact time of about 3 to 5 seconds is employed in order to absorb approximately about 95 percent of the $H_2S$ in the stream. The natural gas, having a reduced $H_2S$ concentration, but still containing the bulk of the COS originally present, exits absorber 2 via line 4, and is passed to hydrolysis or contact zone 5. In unit 5, the gas stream is contacted with a catalyst containing about one percent Pt on activated alumina. The temperature of the exit of reactor 5 is about 100° C., pressure about 200 p.s.i.g., and total contact time in zone 5 is 2 seconds. In this illustration, sufficient water vapor is present from the contactor 2 so that water need not be added. Obviously, water may be added, if necessary. Substantially complete conversion of the COS may be achieved in contact zone 5.

From contact zone 5, the gas stream, now containing $H_2S$ and additional $CO_2$ from the hydrolysis of COS, passes via line 6 to $H_2S$ removal zone 7. Removal zone 7 utilizes a reactant solution, as set out more fully hereinafter. Purified gas is removed via line 8, as shown.

Concomitantly, the loaded absorbent solution in absorber 2, now containing significant quantities of $H_2S$, is passed via line 9 to regeneration zone 10 where the solution is regenerated, producing an acid gas stream in line 11. Regenerated, lean absorbent is returned via line 3 to the absorber 2. Regeneration conditions need not be as severe as when complete removal is needed, and in some cases, flashing may be adequate.

In FIG. 2, a gas stream similar to that described previously enters contactor 2 via line 1 and is contacted with an absorbent mixture from line 3 comprising 75 percent by volume Carbitol and 25 percent by volume water. Approximately 95 percent by volume of $H_2S$ is removed, and "sweetened" gas, still containing 1.25 percent $H_2S$ and 0.1 percent (by volume) COS is removed overhead via line 4. The gas stream in line 4 is contacted in reaction zone 5 in the presence of water vapor with a catalyst comprising about one percent Pt on activated alumina to hydrolyze the COS in the stream to $H_2S$ and $CO_2$. Temperatures, pressures, etc., are similar to those described in reference to FIG. 1. In accordance with the invention, the gas stream, containing the hydrolysis products, passes via line 6 to contactor 7 where it is contacted with a reactant-absorbent mixture to produce sulfur. In particular, an oxidizing reactant absorbent mixture, e.g., a mixture comprising water and iron chelate, the chelate being present in an amount to provide a 0.5 molar mixture of the Fe(III) complex of nitrilotriacetic acid, enters contactor 7 via line 20. The reaction of the $H_2S$ and the Fe(III) chelate of nitrilotriacetic acid produces sulfur and the reduced chelate, and the contactor 7 is preferably operated under conditions to reject $CO_2$ if possible, via line 8. However, the $CO_2$ absorbed is easily disposed of.

Concomitantly, reactant-absorbent mixture, containing some Fe(II) chelate of nitrilotriacetic acid and sulfur, is forwarded via line 21 to regeneration zone 22. As shown in dotted line boxes, the sulfur may be removed prior to regeneration, after regeneration, or by flotation from unit 22.

In regenerator 22, oxygen is supplied, via line 23, in molar excess. Preferably, the oxygen is supplied as air, in a ratio of about 2.0 or greater per mole of Fe(II) chelate in the mixture. Temperature of the mixture is preferably around 30° C., and pressure is suitably 25 psig. Regeneration in this manner has the added advantage of removing some water vapor in the gas overhead, thus aiding in prevention of water build-up in the system and reducing bleed and make-up problems. It is not necessary that all of the Fe(II) chelate be converted.

Regenerated absorbent mixture, i.e., an absorbent mixture in which at least the bulk of the Fe(II) chelate has been converted to the Fe(III) chelate, is removed via line 20, and returned to contactor 7.

Concomitantly, the acid gas recovered in line 11 may be subjected to further treatment or conversion. Preferably, as shown, the $H_2S$-containing gas is forwarded to Claus unit 24 where the great bulk of the $H_2S$, utilizing well known techniques, is converted to elemental sulfur. Offgases, containing residual $SO_2$, leave the Claus unit via line 25, and may be treated such as by reduction, also according to well known procedures, in reactor 26 to form $H_2S$ in the offgases.

The offgases leave unit 26 via line 27, and, according to a preferred embodiment of the invention, are treated in contactor 28 with an oxidizing reactant solution to produce elemental sulfur. As indicated, the solution is preferably the same solution as used in unit 7, so that the same regenerator, unit 22, may be used to regenerate the reactant solution. Should any quite minor amounts of sulfur-containing materials remain in the offgases leaving the top of contactor 28, they may be incinerated (not shown). As shown, loaded solution leaves contactor 28 via line 29 and enters regenerator 22 via line 21 after sulfur removal, although other locations for entry may be provided. Return of the regenerated solution to contactor 28 is shown through line 30. If sulfur removal is made at another location or locations in the primary cycle, e.g., after regenerator 22, return of regenerated solution to unit 28 would preferably be made after that separation rather than returning the sulfur containing regenerated reactant solution through line 30. Thus, a small stream might be taken off, shown as dotted line 31, and returned to contactor 28. It is not necessary that absolutely all sulfur be removed on a continuous basis from the streams; the process may suitably be operated with a minor inventory or significantly reduced content of sulfur in either or both of the oxidizing-reducing cycles. Separate regeneration and sulfur recovery may be provided for unit 28, if for example, different or different-type oxidizing reactant solutions are provided (not shown).

While the invention has been illustrated with particular apparatus, those skilled in the art will appreciate that, except where specified, other equivalent or analogous units may be employed. The term "zone," as employed in the specification and claims, includes, where suitable, the use of segmented equipment operated in series, or the division of one unit into multiple units because of size constraints, etc. For example, an absorption column might comprise two separate columns in which the solution from the lower portion of the first column would be introduced into the upper portion of the second column, the gaseous material from the upper portion of the first column being fed into the lower portion of the second column. Parallel operation of units, is of course, well within the scope of the invention.

Again, as will be understood by those skilled in the art, the solutions or mixtures employed may contain other materials or additives for given purposes. For example, U.S. Pat. No. 3,933,993 discloses the use of buffering agents, such as phosphate and carbonate buffers. Similarly, U.S. Pat. No. 4,009,251 describes various additives, such as sodium oxalate, sodium formate, sodium thiosulfate, and sodium acetate, which may be beneficial.

I claim as my invention:

1. A process for the removal of $H_2S$ and COS from a sour gaseous stream containing $H_2S$ and COS comprising:
   a. contacting the sour gaseous stream in an absorption zone with an aqueous absorbent under conditions to absorb the bulk of the $H_2S$, and producing a product gas stream containing a reduced $H_2S$ concentration and COS, and a loaded absorbent mixture;
   b. contacting the product gas stream containing COS with a catalyst for the hydrolysis of COS, in the presence of water, and under conditions to react COS and water, and producing a gas stream containing $CO_2$ and $H_2S$;
   c. removing $H_2S$ from the gas stream by contacting the gas stream in a first contact zone with an aqueous oxidizing reactant solution which comprises an effective amount of an oxidizing reactant, at a temperature below the melting point of sulfur, and producing a purified gaseous stream and a reactant solution containing sulfur and reduced reactant;

d. concomitantly removing loaded absorbent mixture from the absorption zone, and regenerating the loaded absorbent to produce an acid gas stream comprising H₂S, and a regenerated absorbent;

e. and returning regenerated absorbent to the absorption zone.

2. The process of claim 1 wherein sulfur is removed from the reactant solution containing sulfur and reduced reactant, the reactant solution is regenerated in a regeneration zone, and regenerated reactant solution containing regenerated reactant is returned to the first contact zone.

3. The process of claim 1 wherein the reactant solution containing sulfur and reduced reactant is regenerated in a regeneration zone producing a regenerated reactant solution containing sulfur and regenerated reactant, sulfur is removed from said regenerated reactant solution, and the regenerated reactant solution is returned to the first contact zone.

4. The process of claim 2 wherein the acid gas stream from step (d) is oxidized in an oxidation zone to produce sulfur and offgases, the offgases from the oxidation zone are reduced to produce an offgas-containing H₂S, and the offgas-containing H₂S is contacted in a second contact zone with an aqueous oxidizing reactant solution which comprises an effective amount of an oxidizing reactant, at a temperature below the melting point of sulfur, and producing a purified offgas and a second reactant solution containing sulfur and reduced reactant.

5. The process of claim 4 wherein second reactant containing solution is combined with the reactant solution containing sulfur and reduced reactant produced in step (c), producing a combined stream containing sulfur and reduced reactant, sulfur is removed, the combined stream is regenerated producing a regenerated reactant solution, and regenerated reactant solution is returned to the second contact zone.

6. The process of claim 3 wherein the acid gas stream from step (d) is oxidized in an oxidation zone to produce sulfur and offgases, the offgases from the oxidation zone are reduced to produce an offgas-containing H₂S, and the offgas-containing H₂S is contacted in a second contact zone with an aqueous oxidizing reactant solution which comprises an effective amount of an oxidizing reactant, at a temperature below the melting point of sulfur, and producing a purified offgas and a second reactant solution containing sulfur and reduced reactant.

7. The process of claim 6 wherein the second reactant solution containing sulfur and reduced reactant is regenerated in the regeneration zone sulfur is removed, and regenerated reactant solution is returned to the second contact zone.

8. The process of claim 5 wherein the oxidizing reactant comprises an iron chelate of an oxidizing acid having the formula:

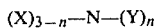

wherein n is a whole number from 1 to 3; Y is an acetic acid or propionic acid group; X is 2-hydroxyethyl, 2-hydroxypropyl, or an alkyl group having from one to four carbon atoms; or

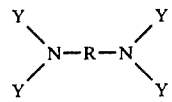

wherein:
from two to four of the groups Y are selected from acetic and propionic acid groups;
from zero to two of the groups Y are selected from 2-hydroxyethyl, 2-hydroxypropyl, and

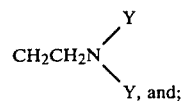

R is ethylene, propylene or isopropylene or alternatively cyclohexane or benzene where the two hydrogen atoms replaced by nitrogen are in the 1,2 position, and mixtures thereof.

9. The process of claim 8 wherein the aqueous absorbent comprises an aqueous alkanolamine.

10. The process of claim 9 wherein the iron chelate is the Fe(II) chelate of nitrilotriacetic acid.

11. The process of claim 7 wherein the oxidizing reactant comprises an oxidizing iron chelate of an acid having the formula:

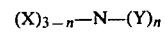

wherein n is a whole number from 1 to 3; Y is an acetic acid or propionic acid group; X is 2-hydroxyethyl, 2-hydroxypropyl, or an alkyl group having from one to four carbon atoms; or
from two to four of the groups Y are selected from acetic and propionic acid groups;
from zero to two of the groups Y are selected from 2-hydroxyethyl, 2-hydroxypropyl, and

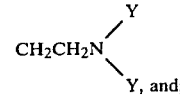

R is ethylene, propylene or isopropylene or alternatively cyclohexane or benzene where the two hydrogen atoms replaced by nitrogen are in the 1,2 position, and mixtures thereof.

12. The process of claim 11 wherein the aqueous absorbent comprises an aqueous alkanolamine.

13. The process of claim 12 wherein the iron chelate is the Fe(III) chelate of nitrilotriacetic acid.

* * * * *